United States Patent Office 3,021,753
Patented Feb. 20, 1962

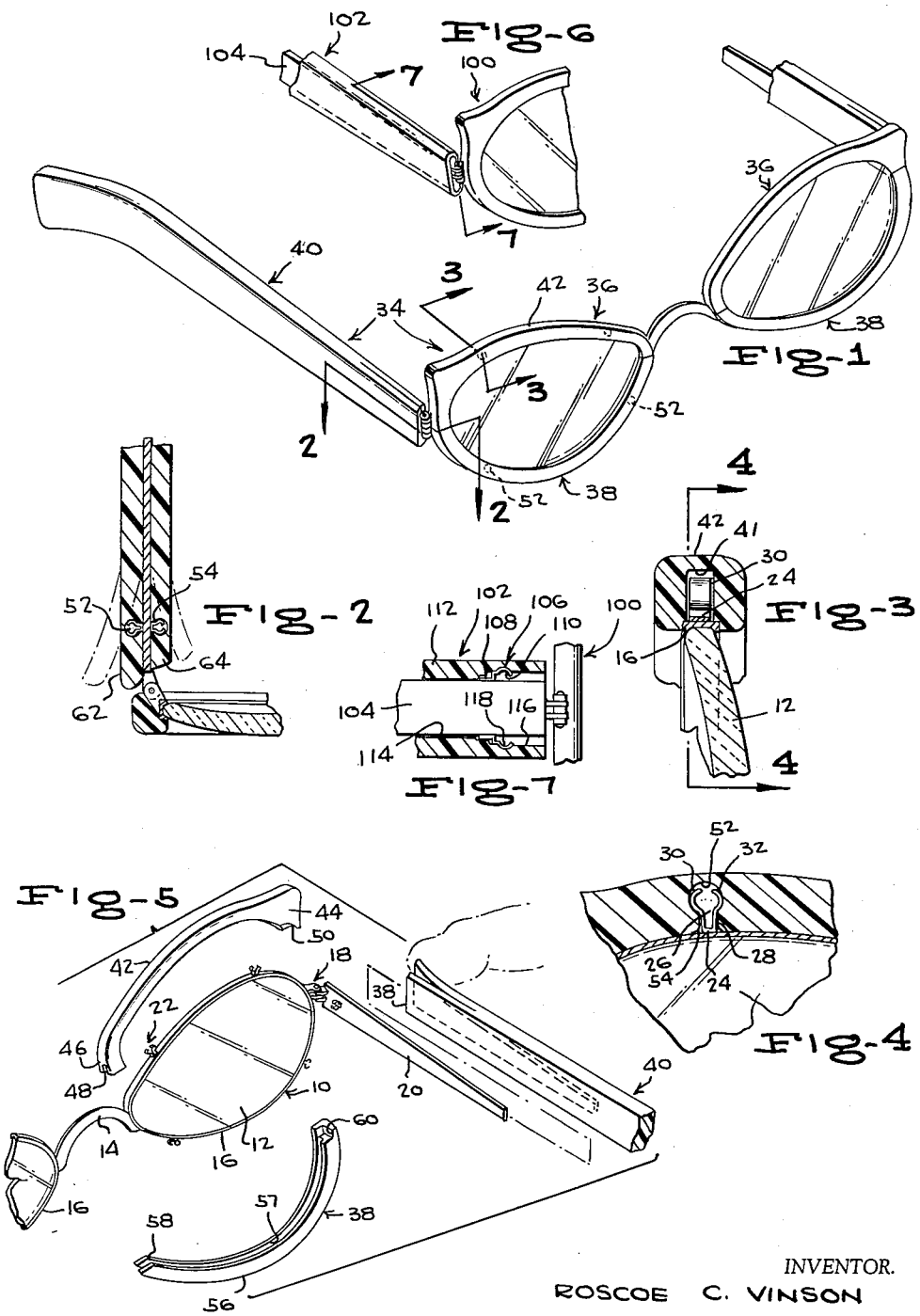

3,021,753
SPECTACLE FRAME
Roscoe C. Vinson, P.O. Box 1982, Birmingham, Ala.
Filed Sept. 12, 1958, Ser. No. 760,610
1 Claim. (Cl. 88—41)

This invention is directed, in general, to clip-on spectacle lens mountings or frames, and more specifically to a detachable spectacle frame.

It is one of the objects of this invention to provide an outer frame for spectacles which is readily interchangeable in order that the style or color of the frame may be made to correspond to, or complement, the wardrobe of the wearer.

Another object resides in the provision of a detachable frame for spectacles wherein the frame is constructed of an inexpensive plastic or other desirable materials.

One important object and advantage of a detachable frame constructed and assembled in accordance with the teachings of this invention is that the aesthetic value thereof is improved by the fact that the fastening means here provided for connecting the frame with the spectacles are concealed from view.

A further object is the provision of a detachable spectacle frame comprising a pair of elongated outer temple members having means for connection with a second pair of inner temple members for the spectacles, a pair of substantially semi-elliptical lower frame members, a pair of substantially semi-elliptical upper frame members, the upper and lower frame members having means for circumferentially engaging a substantially elliptical lens frame.

A still further object of this invention is the provision of connecting means including a pair of confronting substantially flat members to be connected, one of the flat members having a circular cavity or hollow spherical socket formed therein and an access bore leading to the cavity, the other of the flat members to be connected having a substantially U-shaped anchor member or clip extending therefrom for insertion in locking engagement with the circular cavity or socket.

In addition to the above objects, this invention has still another object in the provision of a spectacle frame of the class described, the spectacle frame being non-complex in construction and assembly, inexpensive to manufacture, and durable in use.

Other and further objects and advantages will become more readily apparent from a consideration of the following specification when read in conjunction with the annexed drawing, in which:

FIGURE 1 is a perspective view of a spectacle frame constructed and assembled in accordance with the teachings of this invention, one elongated outer temple member thereof being broken away to provide an illustration of the positioning of the inner temple member;

FIGURE 2 is an enlarged, fragmentary, detail cross-sectional view taken substantially on the horizontal plane of line 2—2 of FIGURE 1, looking in the direction of the arrows;

FIGURE 3 is an enlarged, fragmentary, detail cross-sectional view taken substantially on the vertical plane of line 3—3 of FIGURE 1, looking in the direction of the arrows;

FIGURE 4 is a fragmentary, detail cross-sectional view taken substantially on the vertical plane of line 4—4 of FIGURE 3, looking in the direction of the arrows;

FIGURE 5 is a fragmentary, exploded, perspective view of the spectacle frame illustrating the component elements thereof and the means by which the outer temple member is positioned in and around the inner temple member;

FIGURE 6 is a fragmentary perspective view of a modified form of spectacle frame; and FIGURE 7 is an enlarged fragmentary detail cross-sectional view taken substantially along the section line 7—7 of FIGURE 6, looking in the direction of the arrows.

Referring now more specifically to the drawing, reference numeral 10 designates, in general, an inner lens frame of substantially ellipsoidal configuration for mounting a pair of lenses 12, the frame including a bridge 14 for extension across the nose of the wearer. The frame 10 comprises a pair of rims 16 peripherally engaging the lenses 12 and which are provided with hinge means 18 at the remotely disposed sides thereof for connection with one of the ends of the pair of elongated substantially flat rectangular stub-type temple pieces 20. To serve a function to be described, the rims 16 are each provided with a plurality of peripherally spaced resilient clips 22 having a U-shaped configuration, each of the clips 22 having a bight 24 from the opposed ends of which project a pair of arms 26, 28 which terminate at their outer ends in a pair of oppositely disposed concave-convex terminals 30, 32, respectively, the terminals being arranged with their concave sides disposed in confronting relation (see FIGURE 4). The stub temple pieces 20 also have similar clips 22 which project laterally from opposed sides thereof.

The clip-on frame is connoted, generally, by reference numeral 34 and includes a pair of clip-on top and bottom lens frames 36, 38, respectively, and a pair of elongated clip-one temple pieces or members 40. The frame 34 is preferably formed of plastic material though other materials may be used, and the frame may be colored and/or ornamented as desired.

The top lens frames 36 are of identical configuration except that they are of opposite hand. Each of the frames 36 are semi-ellipsoidal or arcuate in configuration and are formed with a downwardly opening continuous inverted U-shaped channel 41 (see FIGURE 3) which extends through the main body portion 42 and through the depending ends 44, 46 adjacent the temple hinges 18 and adjacent ends of the bridge 14, respectively. This channel has the configuration of substantially the upper half of the rim 16 and the end 46 is slotted at 48 to receive one end of the bridge 14 and the end 44 is cut out at 50 to prevent interference with the action of the hinge 18. The main body portion 42 is provided with a plurality of longitudinally spaced substantially hollow spherical sockets 52 which are placed in open communictaion with the channel 41 by means of substantially hollow cylindrical necks 54 of reduced diameter.

The bottom lens frame 38 is also ellipsoidal or arcuately shaped and is of such length as to embrace the lower half of the rim 16. As before, the frame comprises a main body portion 56 having an arcuate substantailly U-shaped channel 57 extending throughout its length, and the main body portion at the bridge end thereof terminates in a slot 58. The other end of the main body portion is cut out at 60 to embrace adjacent portions of the hinge 18 which is fixedly secured to the rim 16.

As in the case of the top frame member 36, the bottom frame member 38 is formed with a plurality of sockets 52 which are in open communication with the channel 57 through the substantially hollow cylindrical necks 54 also having a reduced diameter.

The temple pieces 40 adjacent the hinged end thereof are bifurcated to form opposed confronting arms 62, 64, and the confronting sides thereof are formed with a third series of spherical sockets 52 and necks 54 (see FIGURE 2).

From the foregoing description, the assembly of the frame 34 is deemed to be obvious, and the order of the assembly steps is variable in the manner desired. It will be understood that the spacing of the sockets on the frame elements 36, 38 and 40 are such as to effect registry with the clips 22 carried on the rim 16 and the stub temple pieces 20. Consequently, it is only necessary, for example, to press the top and bottom over corresponding portions of the rim for each of the lenses causing the terminal ends 30, 32 of the clips 22 to flex inwardly towards each other and to enter the necks 54 (the outer ends of the necks being slightly chamfered to guide the ends 30, 32 and thereby facilitate this step). Continued pressure on the top and bottom frame members causes the terminal ends 30, 32 to pass completely through the necks 54 and to enter the hollow spherical sockets 52 wherein they expand to frictionally engage adjacent portions of the side wall thereof. The flexing of the terminal ends 30, 32 also causes the arms 26, 28 to frictionally engage adjacent portions of the necks 54.

To mount the temple members 40, one of the arms 62 or 64, is flexed away from the other after which the stub temple piece 20 is inserted therebetween. The clips 22 on the opposed sides of the stub temple piece 20 are then aligned with the adjacent hollow spherical sockets 52 formed in the temple members and pressure is then exerted on the remote sides of the arms 62 and 64 to effect entry of the clips 22 within the sockets 52 in the manner described above.

To remove the frame 34 it is only necessary that the wearer grasp the lens 12 and pull outwardly on the main body portion 42 of the top and bottom frame members 36 and 38 causing the terminal ends 30, 32 to flex towards each other for initial removal from the sockets 52 and for subsequent passage in the opposite direction through the necks 54. To effect dismounting of the temple members 40, the arms 62, 64 are flexed away from the stub temple pieces 20 to produce a corresponding relative movement between their respective associated clips and sockets.

In a modified form of this invention, refer to FIGURES 6 and 7 of the drawings, reference numeral 100 designates the outer lens frame, in general, the lens and lens frames being substantially the same as in the former embodiment of this invention. The departure of this species of the invention resides in the construction of the temple assembly 102 wherein a stub-type inner temple piece 104 is provided with a pair of resilient clips 106 positioned on the opposed upper and lower edges thereof. Each of the clips 106 has L-shaped bases 108, the legs of which are secured to the aforesaid edges of the temple pieces, and arcuate, integrally formed terminal ends 110 project laterally from the tips of the feet of said L-shaped bases. As best seen in FIGURE 7, the outer temple member 112 is bifurcated and provided with a longitudinal groove or slot 114 to receive the temple piece 104 and the outer ends of this slot are enlarged at 116. The enlarged outer ends 116 have depressed portions 118 formed at their inner ends to receive the clips 106.

In assembling a spectacle constructed under the above modification, it is only necessary that the user place the inner temples 104 in registry with the slots 114 and push inwardly. The resilient clips will be automatically seated in the depressions 118 and provide pin holding means for the frame.

Having described and illustrated in detail two embodiments of this invention, it will be understood that the same are offered merely by way of example, and that the instant invention is to be limited only by the scope of the appended claim.

What is claimed is:

A demountable frame for glasses having a pair of lenses supported in side-by-side relation by means of a rim for each of said lenses extending peripherally around said lenses and a bridge connecting adjacent sides of said rims, said demountable frame comprising a pair of oppositely disposed top and bottom frame members for each of said lenses, each of said top and bottom frame members having a channel formed therein corresponding to the configurations of the top and bottom portions of each of said rims, each of said top and bottom frame members having a plurality of spaced sockets formed therein opening into the respective said channels, and a plurality of spaced clips projecting radially from said rims for registry with said sockets, said top and bottom frame members receiving and embracing said rims in said channels with said clip means being releasably received within said sockets.

References Cited in the file of this patent

UNITED STATES PATENTS

| | | |
|---|---|---|
| 1,988,423 | Rohrback | Jan. 15, 1935 |
| 2,244,975 | Tinnerman | June 10, 1941 |
| 2,495,508 | Cleaver | Jan. 24, 1950 |
| 2,502,734 | Lyons | Apr. 4, 1950 |
| 2,555,578 | Davis | June 5, 1951 |
| 2,566,236 | Meddoff | Aug. 28, 1951 |
| 2,615,226 | Kral | Oct. 28, 1952 |
| 2,746,110 | Bedford | May 22, 1956 |
| 2,781,693 | Brumby | Feb. 19, 1957 |
| 2,803,994 | De Angelis et al. | Aug. 27, 1957 |
| 2,922,238 | Neary | Jan. 26, 1960 |